O. E. SMITH.
PLAITED PAPER MILK BOTTLE.
APPLICATION FILED JUNE 1, 1915.

1,197,775.

Patented Sept. 12, 1916.

WITNESSES
O. M. Vrooman
J. H. McCollough Jr.

INVENTOR.
Ona E. Smith
BY P. C. Bates
HER ATTORNEY.

UNITED STATES PATENT OFFICE.

ONA E. SMITH, OF SAN JOSE, CALIFORNIA.

PLAITED PAPER MILK-BOTTLE.

1,197,775.             Specification of Letters Patent.      Patented Sept. 12, 1916.

Application filed June 1, 1915. Serial No. 31,485.

*To all whom it may concern:*

Be it known that I, ONA E. SMITH, a citizen of the United States, and a resident of San Jose, in the county of Santa Clara and State of California, have invented a certain new and useful Improvement in Plaited Paper Milk-Bottles, of which the following is a specification.

My invention relates to plaited paper milk bottles for retaining milk therein, and one object of my invention is to produce a plaited paper receptacle of the character mentioned reinforced in such a manner as to make it capable of holding milk, the term milk is used as indicative of any liquid for which the paper bottle is adapted.

A further object of my invention is to produce a plaited paper milk bottle of the character mentioned that will be cheap of construction, durable and sanitary, and one in which the outside and inside may be coated with paraffin, and one in which all the air is excluded from said bottle when filled and capped.

To comprehend the invention, reference should be had to the accompanying sheet of drawings, wherein:—

Figures 1, 2, 3:
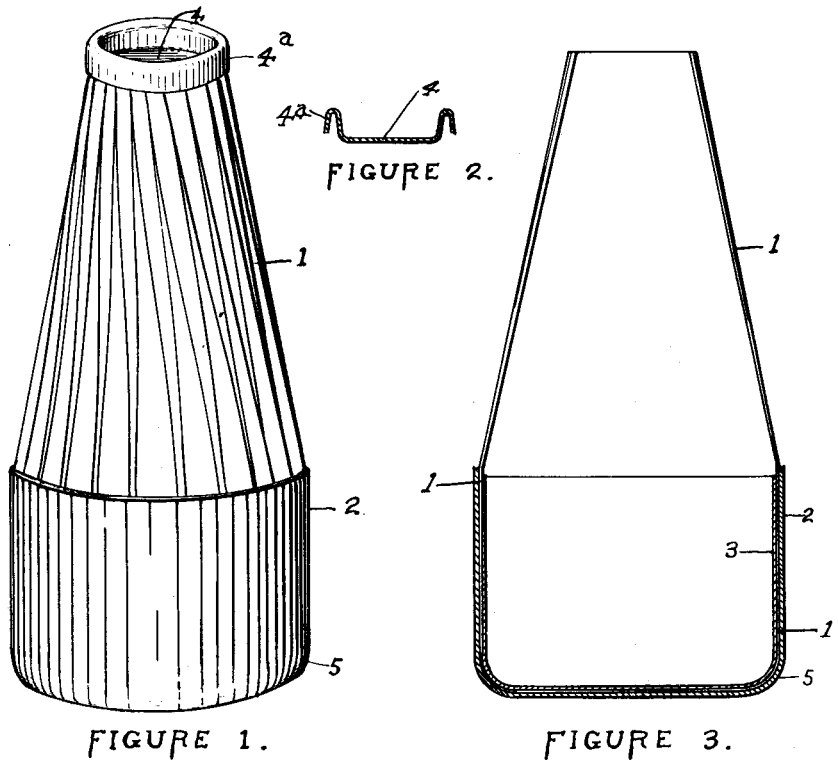
Figure 4:
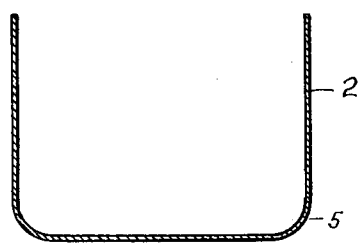
Figure 5:
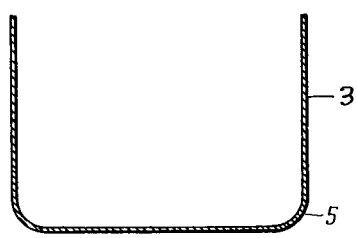

Figure 1 is a perspective view of my improved paper milk bottle with cap in place. Fig. 2 is a sectional view of the closing cap. Fig. 3 is a sectional view of the milk bottle with cap removed. Fig. 4 is a sectional view of the outside reinforcing or the base thereof. Fig. 5 is a sectional view of the inside reinforcing of milk bottle 1.

Similar characters of reference refer to similar parts throughout the several views.

Referring now to the drawings 1 indicates a plaited paper milk bottle which has been rendered impervious to liquids by coating the same with paraffin, the bottom of said milk bottle is reinforced on the outside thereof with a heavy paper base as shown at 2, extending up and around said bottle a distance and secured to said bottle 1 by a coating of paraffin. On the inside of said bottle 1 and at the bottom thereof is reinforcing paper 3, extending up a distance and around the inside of said bottle 1, this paper is secured in place by a coating of paraffin, and is for the purpose of strengthening the lower portion of said bottle 1. The closing cap of said bottle 1 is made of heavy paper having a downward projection as shown at 4, and a curved flange shown at 4ª, when the bottle is filled with milk and the closing cap is placed thereon the projection 4 of said cap fills the vacant space down to the milk and excludes the air therefrom and is held in place by curved flange 4ª fitting closely around the outside and inside of the opening thereof as shown in Fig. 1. The bottom of said milk bottle 1, and the reinforcing paper 2—3 is made slightly rounding as shown at 5, for the purpose of strengthening the same and to avoid any sharp creasing of the bottom thereof.

Having thus described my invention, what I claim as new and desire to secure by Letters Patent, is,—

A water-proof, plaited, paper milk bottle, said bottle being reinforced on the outside and inside, at the bottom and sides thereof, with an extra reinforcement of paper, the same being held in place by a coating of water-proof material, the outer edge of said bottom being slightly rounding, adapted to strengthen the same and to avoid any sharp creasing thereof, means for closing the top opening in said milk bottle, substantially as and for the purpose described.

In testimony whereof I have hereunto affixed my signature in presence of two subscribing witnesses.

ONA E. SMITH.

Witnesses:
    B. BERNOL,
    E. L. SANFORD.